Patented Apr. 30, 1929.

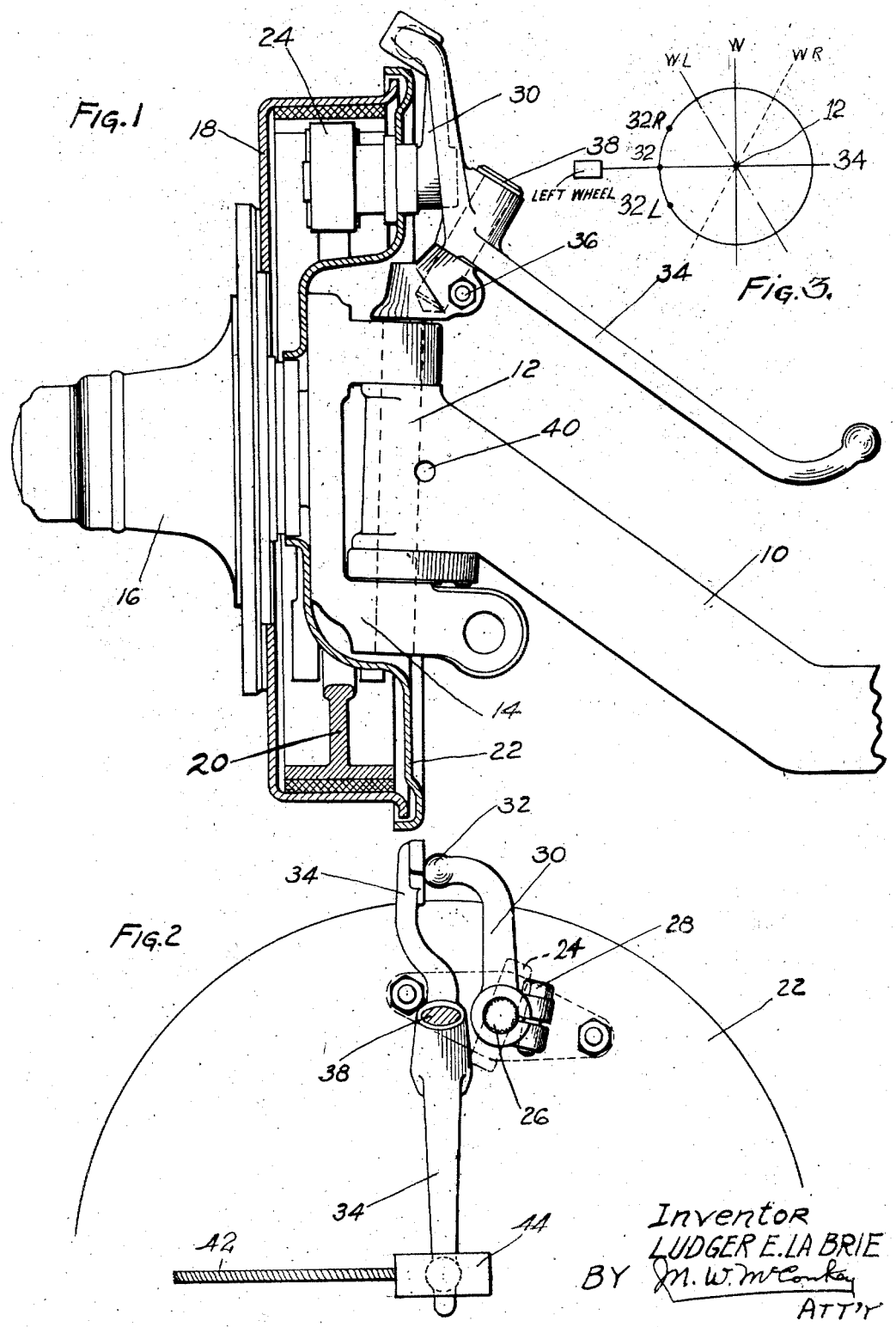

1,711,118

UNITED STATES PATENT OFFICE.

LUDGER E. LaBRIE, OF SOUTH BEND, INDIANA, ASSIGNOR TO BENDIX BRAKE COMPANY, OF CHICAGO, ILLINOIS, A CORPORATION OF ILLINOIS.

BRAKE CONTROL.

Application filed May 7, 1925. Serial No. 28,613.

This invention relates to brakes, and is illustrated as embodied in novel operating connections for a brake for a wheel swivelled for steering movement. One object of the invention is to provide operating connections suitable for use in a wheel and brake assembly in which the room immediately above the king pin is limited, as for example in the case of a heavy swivelled truck wheel having a brake, by arranging for engagement of the parts permitting swivelling of the wheel outside the circumference of the brake drum. In one very good arrangement, the brake is operated by an arm projecting beyond the brake drum, and having a part moved from an idle position spaced from the swivelling axis to a position in or immediately adjacent that axis, the arm preferably being operated by a lever, fulcrumed on the axle or on the king pin or on some other part not affected by swivelling the wheel in steering.

Another feature of the invention relates to a novel mounting for a lever arranged to operate brake connections swivelling with the wheel, by fulcruming the lever on the king pin itself, thus avoiding the difficulties of forming a fulcrum on a relatively heavy part such as the axle.

These and other objects and features of the invention, including various novel combinations of parts and desirable particular constructions, will be apparent from the following description of one illustrative embodiment shown in the accompanying drawings, in which:

Figure 1 is a transverse vertical section through one front brake and associated parts;

Figure 2 is a side elevation, showing the upper part of the brake; and

Fig. 3 is a diagram illustrating the release of the outer brake on a turn.

In the arrangement selected for illustration, the invention is embodied in an automobile chassis including a frame supported by the usual springs on a rear drive axle, and on a front axle 10, at each end of which is swivelled by a king pin 12 a knuckle 14 rotatably supporting a road wheel, the hub of which is shown at 16, and which carries a drum 18. An expanding retarding device is shown, in the form of shoes 20 within the drum and anchored on a backing plate 22, and expanded against the drum 18 by means such as a double cam 24. Except as further described below, the above-identified parts or their equivalents may be of any desired construction.

The cam 24, or other brake-applying device, is operated by means such as a shaft 26, on the serrated end of which is adjustably clamped by a screw 28 an operating member, as an arm 30, shown as having a ball end or other operative part 32 outside of the circumference of the drum and backing plate, where it may be arranged in or immediately adjacent the swivelling axis, i. e., the axis of king pin 12, without in any way limiting the designer in placing the drum or backing plate in any desired position axially of the wheel.

The part 32 may be engaged by an operating member movable from an idle position spaced from the swivelling axis to a position in or immediately adjacent that axis, and preferably in the form of a lever 34 having a surface engaging part 32 and arranged to be connected by a cable or link 42 or the like to the usual brake connections. Cable 42 is shown universally jointed to the ball end of lever 34 by a conventional drag-link joint 44. If desired, the cable or other tension member may be connected directly to part 32, instead of acting through the lever 34, in which case the idle position of part 32 is spaced forwardly of the swivelling axis instead of rearwardly thereof.

Figure 3 is a diagram corresponding to a top plan view, illustrating on an exaggerated scale how the parts may be arranged to relieve the pressure on the outer brake on a turn. In this diagram, 12 is the swiveling axis, or king pin axis, about which the wheel turns, and 34 shows the normal position of the operating lever with the brake applied and with the wheel in the position shown, i. e. straight ahead, paralleling the line W through the axis 12. With the parts in these positions, 32 indicates the position of the center of the ball at the end of arm 30, between axis 12 and the wheel. The distance 12—32 is much exaggerated, and in actual practice is usually around .06 inch.

Now, with the brake applied as described, if the wheel is swiveled to the right, parallel to the line WR, placing it on the outer side of the turn, ball 32 is swung to bring its center to $32^R$, in a direction away from the end of lever 34, thus relieving the pressure on the brake. On the other hand, if the wheel is swung to the left, parallel to WL, placing it on the inner side of the turn, ball end 32 is swung toward 32$^L$, crowding against lever 34 and slightly increasing the pressure on the brake. As is well known, an arrangement of this sort is often considered desirable, as it prevents any possible locking of the wheel by the brake when on the outer side of a turn, thus guarding against loss of steering control. When this action is desired, the front brakes are not equalized against each other.

According to one feature of the invention, lever 34 is fulcrumed on the king pin 12, thus obviating finishing a fulcrum part on the axle, which is relatively large and heavy and hard to handle. In the arrangement shown, the head of the king pin 12 has an inclined socket, in which is clamped by a clamp screw 36 a fulcrum pin 38. The king pin is held from turning by the usual cross key 40.

While one illustrative embodiment of the invention has been described in detail, it is not my intention to limit its scope to that particular embodiment, or otherwise than by the terms of the appended claims. Except as defined by the claims, the general arrangement of the levers 34 and 30 is the invention of Adiel Y. Dodge and Vincent Bendix, and is covered by their application.

I claim:

1. Operating connections for a brake for a swivelled wheel, the brake including a drum rotating with the wheel, and comprising, in combination therewith, operating means, including a lever mounted to swivel with the wheel and having a part outside the circumference of the drum movable from an idle position spaced from the swivelling axis to a position at least near enough that axis not to interfere with swiveling movements in steering, and driver-controlled means engaging said part to move it from idle to active position to apply the brake.

2. Operating connections for a brake for a wheel having a drum and rotatably mounted on a swivelled knuckle and comprising, in combination with said parts, brake-applying means swivelling with the knuckle and including a lever fulcrumed within the circumference of the drum and having an operating part outside the circumference of the drum and movable from an idle position outside the swivelling axis to an active position at least near enough that axis not to interfere with swiveling movements in steering, and an independently supported operating member engaging said part and arranged to move it from idle to active position.

3. Operating connections for a brake for a wheel having a drum and rotatably mounted on a swivelled knuckle and comprising, in combination with said parts, brake-applying means swivelling with the knuckle and including an operating part outside the circumference of the drum and movable from an idle position outside the swivelling axis to an active position at least near enough that axis not to interfere with swivelling movements in steering, and a pivoted lever engaging said part and arranged to move it from idle to active position.

4. Operating connections for a brake for a wheel having a drum and rotatably mounted on a swivelled knuckle and comprising, in combination with said parts, brake-applying means swivelling with the knuckle and including a lever fulcrumed within the circumference of the drum and having an operating part outside the circumference of the drum and movable from an idle position outside the swivelling axis to an active position at least near enough that axis not in interfere with swiveling movements in steering, and a tension member connected to said part to pull it from idle to active position.

5. Operating connections for a brake for a wheel having a drum and rotatably mounted on a swivelled knuckle and comprising, in combination with said parts, a brake-applying arm supported to swivel with the knuckle and having a part outside the circumference of the drum and movable from an idle position outside of the swivelling axis to an active position at least near enough said axis not to interfere with swiveling movements in steering, and means engaging said part of the arm to move it from idle to active position.

6. Operating connections for a brake for a wheel having a drum and rotatably mounted on a swivelled knuckle and comprising, in combination with said parts, a brake-applying arm supported to swivel with the knuckle and having a part outside the circumference of the drum and movable from an idle position outside of the swivelling axis to an active position at least near enough said axis not to interfere with swivelling movements in steering, and a lever swinging generally horizontally and engaging said part of the arm to move it from idle to active position.

7. Operating connections for an expanding retarding device within a drum rotating with a wheel mounted on a swivelled knuckle, and comprising, in combination with said parts, spreading means acting on the ends of the retarding device within the drum, an arm operating said means and swivelling with the knuckle and extending outside the circumference of the drum and having a part arranged, when the brake is applied at least near enough the swivelling axis not to interfere with swivelling movements in steering, and means engaging said part of the arm to apply the brake.

8. Operating connections for an expanding retarding device within a drum rotating with a wheel mounted on a swivelled knuckle, and comprising in combination with said parts, a cam acting on the retarding device within the drum, an arm rocking the cam and swivelling with the knuckle and extending outside the circumference of the drum and having a part arranged when the brake is applied at least near enough the swivelling axis not to interfere with swivelling movements in steering, and means engaging said part of the arm to apply the brake.

9. Operating connections for shoes mounted within a drum rotating with a wheel, on a swivelled knuckle and comprising, in combination with said parts, a cam between the free ends of the shoes, a shaft carrying the cam, an arm secured to the shaft and extending radially outward past the circumference of the drum and there having a part arranged when the brake is applied at least near enough the swivelling axis not to interfere with swivelling movements in steering, and means engaging said part of the arm to apply the brake.

10. Operating connections for shoes mounted within a drum rotating with a wheel on a swivelled knuckle and comprising, in combination with said parts, a cam between the free ends of the shoes, a shaft carrying the cam, an arm secured to the shaft and extending radially outward past the circumference of the drum and there having a part arranged when the brake is applied at least near enough the swivelling axis not to interfere with the swivelling movements in steering, means for adjusting the arm angularly of the shaft, and means engaging said part of the arm to apply the brake.

11. Operating connections for a brake for a wheel rotatably mounted on a swivelled knuckle, and comprising, in combination with said parts, brake-applying means swivelling with the knuckle and including a part outside the drum circumference and means engaging said part to apply the brake, the point of engagement being so arranged with respect to the swivelling axis when the brake is applied as to vary the braking when the knuckle is swivelled, in the manner described.

12. Operating connections for a brake for a wheel rotatably mounted on a swivelled knuckle, and comprising, in combination with said parts, brake-applying means swivelling with the knuckle and including an arm extending outside the drum circumference and movable toward the swivelling axis from an idle position spaced from said axis, and means engaging said arm to apply the brake, the point of engagement being so arranged with respect to the swivelling axis when the brake is applied as to vary the braking when the knuckle is swivelled, in the manner described.

13. Operating connections for a brake for a wheel rotatably mounted on a swivelled knuckle, and comprising, in combination with said parts, brake-applying means swivelling with the knuckle and including an arm extending outside the drum circumference and movable toward the swivelling axis from an idle position spaced from said axis, and a lever engaging the arm to move it to an active position with the point of engagement between the swivelling axis and the wheel to vary the braking when the knuckle is swivelled, in the manner described.

14. Operating connections for a brake for a wheel rotatably mounted on a knuckle swivelled by a king pin at one end of an axle, and comprising, in combination with said parts, brake-operating means swivelling with the knuckle and including an arm swinging from an idle position to an active position in which a part is substantially in the king pin axis, and a lever fulcrumed on the king pin and engaging said part of the lever to move the ever to active position.

15. Operating connections for a brake for a wheel rotatably mounted on a knuckle swivelled by a king pin at one end of an axle, and comprising, in combination with said parts, brake-operating means swivelling with the knuckle and including an arm swinging from an idle position spaced from the king pin axis to an active position in which a part is substantially in that axis, and a generally horizontal lever fulcrumed on the king pin and engaging said part of the lever to move the lever to active position.

16. Front brake mechanism comprising, in combination, an axle having a knuckle swivelled thereto by a king pin, a wheel rotatably mounted on the knuckle and having a brake drum, a brake within the drum spaced at its upper side outwardly from the swivelling axis, a lever fulcrumed on the king pin and movable in a generally horizontal direction to move a part substantially into the king pin axis, and means operated by engagement with said part to apply the brake.

17. Front brake mechanism comprising, in combination, an axle having a knuckle swivelled thereto by a king pin, a wheel rotatably mounted on the knuckle and having a brake drum, brake shoes within the drum, a lever fulcrumed on the king pin and movable in a generally horizontal direction to move a part substantially into the king pin axis, and means operated by engagement with said part to expand the shoes in opposite directions against the drum.

18. Front brake mechanism comprising, in combination, an axle having a knuckle swivelled at its end by a king pin, a wheel rotatably mounted on the knuckle, a brake for the wheel, an inclined fulcrum pin carried by the head of the king pin, a lever fulcrumed on said inclined pin and movable to swing a part from a position spaced from the king pin axis to a position substantially in said axis and outside the circumference of the drum, and means engaged by said part of the lever to apply the brake.

19. Front brake mechanism comprising, in combination, an axle having a knuckle swivelled at its end by a king pin, a wheel and drum rotatably mounted on the knuckle, a brake for the drum, an inclined fulcrum pin carried by the head of the king pin, a lever fulcrumed on said inclined pin and movable to swing a part outside the circumference of the drum from a position spaced from the king pin axis to a position substantially in said axis, and means engaged by said part of the lever outside the circumference of the drum to apply the brake.

20. Front brake mechanism comprising, in combination, an axle having a knuckle swivelled at its end by a king pin, a wheel and drum rotatably mounted on the knuckle, an expansible brake mounted on the knuckle within the drum, means for applying the brake including a part outside the circumference of the drum movable from an idle position spaced from the king pin axis to an active position substantially in said axis, an inwardly inclined fulcrum pin carried by the king pin, and a lever fulcrumed on the inclined pin and extending outside the circumference of the drum to engage and operate said part.

In testimony whereof I have hereunto signed my name.

LUDGER E. LABRIE.